United States Patent Office 3,278,260
Patented Oct. 11, 1966

3,278,260
PREPARATION AND PURIFICATION OF LITHIUM CHLORIDE
John A. Hermann, Golden, Colo., assignor to Kerr-McGee Oil Industries, Inc., a corporation of Delaware
No Drawing. Filed Feb. 8, 1963, Ser. No. 257,095
7 Claims. (Cl. 23—89)

This invention relates to the preparation and purification of lithium chloride. In some of its more specific aspects, the invention further relates to the preparation of lithium chloride from spodumene ore or lithium sulfate as a starting material and the purification of the lithium chloride thus produced.

Lithium chloride is an important article of commerce. Usually, it is prepared from lithium sulfate, which is converted to the carbonate and then to the chloride, or by neutralization of lithium hydroxide with hydrochloric acid.

As is well known, lithium sulfate may be readily prepared from spodumene ore and thus it is a relatively cheap substance. However, it has been difficult heretofore to prepare substantially pure lithium chloride from spodumene ore or lithium sulfate as the starting material without resorting to complicated and expensive purification procedures due to the presence of contaiminating impurities. As a result, the art has long sought an improved process for the preparation and purification of lithium chloride.

It is an object of the present invention to provide a novel method of separating lithium chloride from a mixture including a contaminating salt such as potassium chloride, sodium chloride, potassium sulfate or sodium sulfate.

It is a further object to provide a method of obtaining substantially pure lithium chloride from an alcohol solution which also contains a dissolved contaminating salt.

It is still a further object to provide a novel method of preparing substantially pure lithium chloride from spodumene ore or lithium sulfate as a starting material.

Still other objects and advantages of the invention will be apparent to those skilled in the art upon reference to the following detailed description and the examples.

It has been discovered that substantially pure lithium chloride may be obtained from a mixture containing lithium chloride and at least one salt as an impurity such as potassium chloride, sodium chloride, potassium sulfate and sodium sulfate. This may be conveniently accomplished by intimately contacting the mixture with an alcohol containing three to eight inclusive carbon atoms to dissolve lithium chloride and produce an alcohol solution of lithium chloride, and thereafter recovering the lithium chloride from the alcohol solution while it is anhydrous and substantially free of suspended or undissolved contaminating salts. It has been further discovered that it is possible to prepare lithium chloride from lithium sulfate by metathesis of potassium chloride or sodium chloride and lithium sulfate in alcohol solution, followed by removal of water from the alcohol solution, where necessary, and recovery of the resulting substantially pure lithium chloride from the anhydrous alcohol solution. It has been further discovered that spodumene ore may be readily treated in accordance with the procedure to be discussed hereinafter to produce lithium sulfate, which then may be metathesized with sodium or potassium chloride in alcohol solution to produce a solution of lithium chloride from which substantially pure lithium chloride may be obtained.

The alcohols for use in practicing the present invention contain three to eight inclusive carbon atoms. The alcohols may be straight or branched chain, or cyclic in nature. Examples of suitable alcohols include propyl alcohol, isopropyl alcohol, normal butyl alcohol, isobutyl alcohol, normal amyl alcohol, isoamyl alcohol, norma hexyl alcohol, cylohexanol, 2-ethyl hexanol, etc. Usually, the most satisfactory alcohols contain four, five or six carbon atoms, of which normal butyl alcohol usually is preferred.

It is essential that the alcohol be anhydrous at the time of recovering lithium chloride therefrom if a lithium chloride product of substantially pure grade is to be produced. When small amounts or even traces of water are present in the alcohol solution, then the lithium chloride product invariably contains a substantial amount of contaminating salts. The alcohol solution may be rendered anhydrous by any of a number of suitable methods known to the art, including contacting it with a dehydrating substance designed to remove the water by adsorption or absorption such as silica gel. Physical methods of separation such as distillation may be used, including azeotropic distillation, or any other method known to the art suitable for the dehydration of the specific alcohol.

It has been discovered that sodium chloride, potassium chloride, sodium sulfate, lithium sulfate, potassium sulfate and similar contaminating impurities are present in the alcohol solution of lithium chloride because the latter contains a small amount of water. If the water content is eliminated by drying the alcohol in some manner known to the art, substantially all of the impurities precipitate thereby leaving a solution of lithium chloride substantially free of contaminating alkali metal salts. The precipitated alkali metal salts may be separated by filtration, and lithium chloride is recovered from the resulting substantially pure alcohol solution. The lithium chloride may be recovered by evaporation of the alcohol solution to leave the lithium chloride behind as a solid, or by other methods such as by stripping a water-insoluble alcohol with water, followed by evaporation of the resultant aqueous solution of lithium chloride.

One preferred method of producing lithium chloride is by metathesis of lithium sulfate and sodium chloride or postassium chloride in alcohol solution. In carrying out the metathesis a completely anhydrous alcohol may be used, but usually it is preferred that a small amount of water be present as the reaction proceeds at a much more rapid rate.

In one preferred variant, lithium sulfate or sulfated spodumene ore is mixed with a slight stoichiometric excess of sodium or potassium chloride. The mixture is intimately contacted with alcohol containing a small amount of dissolved water over a period of time sufficient to give the desired conversion of lithium sulfate to lithium chloride and potassium chloride to potassium sulfate. The lithium chloride product of the metathesis is extracted into the alcohol solution as the reaction proceeds and the potassium sulfate is largely rejected and remains in the solid matter treated. The resultant alcohol phase contains the lithium chloride product contaminated with potassium chloride and trace amounts of potassium sulfate. The lithium chloride content of the alcohol is recovered by completely drying the alcohol, during which step the potassium chloride and other alkali metal salts present precipitate with the exception of lithium chloride. Thereafter, the precipitated alkali metal salts which are substantially free of lithium chloride, including the potassium chloride, are separated by filtration leaving a substantially pure solution of lithium chloride in the alcohol. The lithium chloride is recovered by evaporation of the alcohol or by extraction with water, followed by evaporation of the water to produce solid lithium chloride.

The metathesis results in the upgrading of both potassium chloride and lithium sulfate, as each of these starting materials is relatively cheap and available in large supply. The resulting products in each instance are of greater value as potassium sulfate is a higher priced chemical than potassium chloride, and lithium chloride is more expensive than lithium sulfate.

The lithium sulfate may be of high purity, or sulfated spodumene ore which contains relatively low percentages of lithium sulfate may be used. For economic reasons, usually it is preferred that a sulfated spodumene ore be used. Regardless of the source of the lithium sulfate, usually it is preferred that it be dry or contain very little water as large amounts of water will collect in the alcohol and increase the amount of drying necessary during the alcohol dehydration step. Also, the alcohol solution may be contaminated with higher concentrations of alkali metal salts.

In instances were spodumene ore is used as the starting material, it is preferred that alpha-spodumene ore be crushed to a fine size such as —10 mesh or smaller. The ore may contain initially a low percentage of lithium oxide, such as 1–2% and it is upgraded by calcining at 1,000° C., dry scrubbing and air classification to produce beta-spodumene ore containing 3–4% lithium oxide. The beta-spodumene is then subjected to treatment with a sulfating agent such as gaseous sulfuric acid to thereby produce a sulfated spodumene ore which contains lithium sulfate. Thereafter, the sulfated ore may be used as the lithium sulfate-containing material to be metathesized with potassium or sodium chloride in accordance with the invention. If desired, the ore may be sulfated following the procedure described in Canadian Patent No. 592,353, the teachings of which are incorporated herein by reference.

While sodium chloride or potassium chloride may be used in metathesizing the lithium sulfate, potassium chloride is preferred. Normally sodium or potassium chloride is added in a slight stoichiometric excess but a larger amount may be added. In instances where less than the stoichiometric amount is used, then all of the lithium sulfate will not be metathesized and this is a disadvantage in instances where high yields are desired.

While batch operation is effective, continuous countercurrent operation may be preferred in instances where lithium chloride is to be produced on a commercial scale. For instance, alcohol containing substantial amounts of lithium chloride may be advanced continuously against fresh charges of sulfated spodumene in the presence of potassium chloride, while the lithium depleted sulfated spodumene may be advanced continuously against fresh alcohol containing small amounts of lithium chloride.

The present invention also offers a very effective method of separating lithium chloride from solid mixtures containing other alkali metal salts such as potassium chloride, sodium chloride, sodium sulfate and potassium sulfate, etc. For instance, the solid mixture of salts may be rendered anhydrous by heating to an elevated temperature or by using other methods, and then it may be contacted with a completely anhydrous alcohol to produce a substantially pure solution of lithium chloride. The resultant alcohol solution of lithium chloride may be separated from the rejected solids, filtrated, and substantially pure lithium chloride recovered therefrom by evaporation of the alcohol or by extraction of the alcohol with a small amount of water followed by evaporation of the aqueous solution. It is also possible to use a salt mixture which is not anhydrous and/or an alcohol which is not anhydrous. After dissolving the lithium chloride from the mixture together with contaminating salts, the alcohol solution is separated from the rejected solids, dehydrated, filtered of any precipitated solid matter, and lithium chloride recovered therefrom as a substantially pure product.

The foregoing detailed description and the following specific examples are for purposes of illustration only and are not intended as being limiting to the spirit or scope of the appended claims.

EXAMPLE I

This example illustrates the metathesis of potassium chloride and lithium sulfate in the presence of anhydrous normal butyl alcohol to produce lithium chloride and potassium sulfate.

21.8 grams of KCl, 16.5 grams of $Li_2SO_4$ and 100 milliliters of normal butyl alcohol were intimately contacted at 25° C. The alcohol was anhydrous, as was the potassium chloride and lithium sulfate. Samples of the alcohol were analyzed for lithium at various intervals of time subsequent to the initial contacting of the mixture and the following data were obtained:

TABLE I

| Expired Time | Alcohol Assay For: | |
|---|---|---|
| | LiCl (g./l.) | KCl (g./l.) |
| 10 minutes | 0.4 | Trace |
| 30 minutes | 0.7 | Trace |
| 3 hours | 1.5 | 0.05 |
| 20 hours | 3.5 | |
| 92 hours | 19.9 | 0.05 |

It is evident from the above data that the metathesis and extraction of the resultant lithium chloride occurs satisfactorily under anhydrous conditions.

Upon separating the alcohol solution of lithium chloride from the remaining solid material, followed by evaporation of the alcohol solution, lithium chloride is obtained as a substantially pure product. Only a trace of potassium chloride, lithium sulfate or potassium sulfate is present in the lithium chloride product.

EXAMPLE II

This example illustrates the metathesis of potassium chloride and lithium sulfate in the presence of a small amount of water to speed up the metathesis.

The conditions of Example I were repeated with the exception of saturating the alcohol with water before contacting with the potassium chloride and lithium sulfate. The resultant normal butyl alcohol containing a small amount of water dissolved therein was then intimately contacted with the potassium chloride and lithium sulfate. Analysis of the alcohol samples for lithium at given intervals gave the following results:

TABLE II

| Expired Time | Alcohol Assay For: | | |
|---|---|---|---|
| | LiCl(g./l.) | KCl(g./l.) | $SO_4$ |
| 5 minutes | 18 | 1.2 | Negative. |
| 20 minutes | 21 | 1.1 | Negative. |
| 1 hour | 27 | 1.1 | Negative. |
| 2 hours | 33 | 1.2 | Negative. |
| 6 hours | 40 | 1.1 | Negative. |
| 26 hours | 53 | | Negative. |
| 76 hours | 49 | 1.0 | Negative. |

When the above data are compared with those obtained in Example I, it is apparent that the presence of water in the alcohol accelerates the metathesis.

A sample of the alcohol solution of lithium chloride was evaporated to dryness, and the lithium chloride product was found to be contaminated with potassium chloride. Also, when a portion of the alcohol solution was extracted with water, and the resultant water solution of lithium chloride evaporated, the lithium chloride product was found to be contaminated with potassium chloride. Thus, it is apparent that an impure lithium chloride product is produced when the alcohol contains water at the time of recovery of the lithium chloride.

67 grams of the final alcohol solution (at 76 hours, containing 49 g./l. LiCl and 1.0 g./l. KCl) was distilled in a flask fitted with a small fractionating column until the vapors reached a constant temperature (110–111° C.).

26 grams of distillate were obtained. The residue in the pot after cooling was filtered from the precipitated solids and the filtrate so obtained contained 70 grams per liter of lithium chloride and only 0.05 gram per liter of potassium chloride. The solids obtained in the filtration step were substantially pure potassium chloride. The concentrated dried butanol solution was stripped with five portions (5 milliliters each) of water, and the five portions of water were combined and evaporated to dryness to yield a lithium chloride product containing less than 0.01% potassium, and less than 0.07% sulfate.

The lithium chloride product was 99.92% pure. It is therefore apparent that when the alcohol solution is dried, a substantially pure lithium chloride product may be produced even though the alcohol solution prior to the dehydration step contains substantial amounts of impurities.

EXAMPLE III

This example illustrates the preparation of substantially pure lithium chloride from spodumene ore.

Alpha-spodumene ore containing about 1.2% $Li_2O$ is crushed and ground to —10 mesh. Thereafter, the ore is calcined at 1,000° C. to convert it to beta-spodumene, followed by dry scrubbing and air classification to produce a fine concentrated fraction of —100 mesh which contains 3.65% $Li_2O$.

The concentrated beta-spodumene ore is subjected to vapor phase sulfation with gaseous sulfuric acid ($H_2SO_4$) in the presence of air to produce a sulfated beta-spodumene ore containing lithium sulfate. The sulfated spodumene is then mixed with sufficient potassium chloride to provide a slight excess of the stoichiometric amount required for metathesis with the total amount of lithium sulfate contained in the ore to produce lithium chloride and potassium sulfate. Then, the mixture is contacted with normal butyl alcohol saturated with water.

The sulfated spodumene is contacted with the alcohol countercurrently and on a continuous basis, with fresh alcohol being contacted with ore depleted in lithium chloride and the alcohol solution concentrated with respect to lithium chloride being contacted with fresh ore containing relatively large amounts of lithium chloride. In this manner, it is possible to carry out the metathesis and simultaneously produce an alcohol solution of the lithium chloride on a continuous commercial scale.

The alcohol solution of lithium chloride is separated from the insoluble constituents of the spodumene ore, filtered, and dried by distillation until a constant boiling point is obtained. The resulting precipitated impurities which consist largely of potassium chloride are removed by filtration and recycled in the process together with the distilled portion. The distillate bottoms are extracted with water to produce an aqueous lithium chloride solution, which is evaporated to dryness. The resultant lithium chloride product contains only traces of potassium chloride and potassium sulfate, and is substantially pure lithium chloride.

What is claimed is:

1. A method of preparing lithium chloride comprising the steps of calcining alpha-spodumene ore to produce beta-spodumene ore, sulfating the beta-spodumene ore with gaseous sulfuric acid to thereby produce sulfated beta-spodumene ore, adding an alkali metal chloride selected from the group consisting of potassium chloride and sodium chloride to the spodumene ore, intimately contacting the sulfated beta-spodumene ore with an alcohol containing three to eight carbon atoms inclusive in the presence of the said alkali metal chloride to thereby produce lithium chloride and a sulfate of the said alkali metal, the lithium chloride thus produced being dissolved in the alcohol to produce an alcohol solution of lithium chloride, the alcohol solution also containing dissolved water and at least one dissolved salt as an impurity selected from the group consisting of the said alkali metal chloride and the said alkali metal sulfate, separating the alcohol solution from the undissolved constituents of the spodumene ore, removing water present in the alcohol solution to thereby produce an anhydrous alcohol solution of lithium chloride and precipitate the said dissolved salt impurity from the alcohol solution, separating precipitated matter from the anhydrous alcohol solution of lithium chloride, and thereafter recovering lithium chloride substantially free of the said alkali metal chloride and the said alkali metal sulfate from the anhydrous alcohol solution.

2. A method of preparing lithium chloride comprising the steps of calcining alpha-spodumene ore to produce beta-spodumene ore, sulfating the beta-spodumene ore with gaseous sulfuric acid to thereby produce sulfated beta-spodumene ore, adding potassium chloride to the spodumene ore, intimately contacting the sulfated beta-spodumene ore with an alcohol containing three to eight carbon atoms inclusive in the presence of the potassium chloride to thereby produce lithium chloride and potassium sulfate, the lithium chloride thus produced being dissolved in the alcohol to produce an alcohol solution of lithium chloride, the alcohol solution also containing dissolved water and at least one dissolved salt as an impurity selected from the group consisting of potassium chloride and potassium sulfate, separating the alcohol solution from the undissolved constituents of the spodumene ore, removing water present in the alcohol solution to thereby produce an anhydrous alcohol solution of lithium chloride and precipitate the said dissolved salt impurity from the alcohol solution, separating precipitated matter from the anhydrous alcohol solution of lithium chloride, and thereafter recovering lithium chloride substantially free of potassium chloride and potassium sulfate from the anhydrous alcohol solution.

3. The method of claim 1 wherein the alcohol contains four carbon atoms.

4. The method of claim 1 wherein the alcohol contains five carbon atoms.

5. The method of claim 2 wherein the alcohol is selected from the group consisting of normal butyl alcohol, isobutyl alcohol, normal amyl alcohol and cyclohexanol.

6. A method of preparing lithium chloride comprising the steps of calcining alpha-spodumene ore to produce beta-spodumene ore, sulfating the beta-spodumene ore with gaseous sulfuric acid to thereby produce sulfated beta-spodumene ore containing lithium sulfate, adding potassium chloride to the sulfated spodumene ore in at least the amount theoretically required to react with the lithium sulfate content to produce lithium chloride and potassium sulfate, intimately contacting the sulfated beta-spodumene ore with normal butyl alcohol in the presence of the potassium chloride to thereby produce lithium chloride and potassium sulfate, the lithium chloride thus produced being dissolved in the alcohol to produce an alcohol solution of lithium chloride, the alcohol solution also containing dissolved water and at least one dissolved salt as an impurity selected from the group consisting of potassium chloride and potassium sulfate, separating the alcohol solution from the undissolved constituents of the spodumene ore, removing water present in the alcohol solution to thereby produce an anhydrous alcohol solution of lithium chloride and precipitate the said dissolved salt impurity from the alcohol solution, separating precipitated matter from the anhydrous alcohol solution of lithium chloride, and thereafter recovering lithium chloride substantially free of potassium chloride and potassium sulfate from the anhydrous alcohol solution.

7. A method of preparing lithium chloride comprising the steps of calcining alpha-spodumene ore having a particle size not greater than —10 mesh at a temperature of at least 1,000° C. to produce beta-spodumene ore, sulfating the beta-spodumene ore with gaseous sulfuric acid to thereby produce sulfated beta-spodumene ore containing lithium sulfate, adding potassium chloride to the sulfated spodumene ore in at least the amount theoretically required to react with the lithium sulfate content to produce lithium chloride and potassium sulfate, intimately contacting the sulfated beta-spodumene ore with normal butyl alcohol in the presence of the potassium chloride to thereby produce lithium chloride and potassium sulfate, the lithium chloride thus produced being dissolved in the alcohol to produce an alcohol solution of lithium chloride, the alcohol solution also containing dissolved water and at least one dissolved salt as an impurity selected from the group consisting of potassium chloride and potassium sulfate, separating the alcohol solution from the undissolved constituents of the spodumene ore, removing water present in the alcohol solution by distillation to thereby produce an anhydrous alcohol solution of lithium chloride and precipitate the said dissolved salt impurity from the alcohol solution, filtering precipitated matter from the anhydrous alcohol solution of lithium chloride, intimately contacting the anhydrous alcohol solution with water to extract the lithium chloride and produce an aqueous solution of lithium chloride substantially free of potassium chloride and potassium sulfate, and evaporating the aqueous solution to recover the lithium chloride.

References Cited by the Examiner

UNITED STATES PATENTS

| | | | |
|---|---|---|---|
| 2,516,109 | 7/1950 | Ellestad et al. | 23—89 X |
| 2,533,246 | 12/1950 | Hayes | 23—89 |
| 2,561,439 | 7/1951 | Erasmus | 23—89 X |
| 2,662,809 | 12/1953 | Kroll | 23—89 X |
| 2,893,828 | 7/1959 | Peterson et al. | 23—89 X |

OTHER REFERENCES

Lange's Handbook of Chemistry, 10th Edition, 1961, pp. 294–295, McGraw-Hill Book Co., Inc., N.Y.

Seidell's Book—"Solubilities of Inorganic and Organic Compounds," vol. 1, 1919, pp. 378, 561, 671 and 672, D. Van Nostrand Co., Inc., N.Y.

OSCAR R. VERTIZ, *Primary Examiner.*

MAURICE A. BRINDISI, *Examiner.*

E. STERN, *Assistant Examiner.*